Patented Sept. 16, 1952

2,610,981

UNITED STATES PATENT OFFICE 2,610,981

PRODUCTION OF THIOLS AND THIOETHERS

Graham H. Short, Bartlesville, Okla., assignor to Phillips Petroleum Company, a corporation of Delaware No Drawing. Application August 28, 1947,
Serial No. 771,157

7 Claims. (Cl. 260—609)

This invention relates to an improved process for the manufacture of organic sulfur compounds. In one embodiment, this invention relates to the direct addition of a compound having the formula RSH, in which "R" represents hydrogen or an organic radical substantially inert under the reaction conditions used, to an ethylenic linkage in an organic compound, in the presence of a novel catalyst to produce mercaptans and/or organic sulfides. A more specific embodiment involves the manufacture of useful mercaptans from olefins and hydrogen sulfide through the agency of activated montmorillonite clay as a catalyst, and the invention will be described with particular reference to this embodiment.

An object of the invention is to effect catalytically the addition of (1) hydrogen sulfide or (2) mercaptans, to olefinic materials to produce (1) mercaptans and/or (2) sulfides.

The direct synthesis of organic sulfur compounds, especially mercaptans and sulfides (thioethers), by the addition of hydrogen sulfide or mercaptans to olefinic materials, with or without the presence of a catalyst, has been reported by various investigators. However, the specificity of these reactions has not been of the order frequently required, due to the elevated temperatures employed for straight thermal reaction, and due to the consequent production of undesirable side reactions by virtue of the thermal instability of the desired product, and also due to the production of saturated hydrocarbons at high temperatures which seriously interfere with the yield of the desired organic sulfur compounds.

Catalytic processes with particular emphasis on the manufacture of low molecular weight mercaptans, have been advanced. Recommended solid contact catalysts have previously included metallic sulfides, fuller's earth, silica gel, and charcoal. The activity of these catalysts leaves much to be desired, since temperatures of 400° to 500° F. are often necessary to effect reaction at a practical rate. Adsorptive clays of the fuller's earth type have been proposed as catalysts for this reaction. Such catalysts are in some cases suitable for the production of relatively low molecular weight mercaptans because of their pronounced depolymerizing activity toward the higher olefins. However, this property often results in an inefficient process when high-boiling mercaptans are desired. In general, it may be stated that the natural adsorption catalysts thus far proposed for the olefin-hydrogen sulfide or the olefin-mercaptan reaction are deficient in activity, and especially in specificity, in the production of mercaptans and sulfides containing twelve or more carbon atoms per molecule.

The process of the present invention comprises the contacting of controlled proportions of an olefinic hydrocarbon, or an olefinic hydrocarbon mixture, such as a mixture of dodecylene and higher homologues, and hydrogen sulfide or an alkyl mercaptan or mercaptans with a solid contact catalyst which comprises activated montmorillonite clay. The process is particularly applicable to the manufacture of high-boiling mercaptans and/or thioethers by the direct addition of hydrogen sulfide and/or mercaptans to olefins containing eight or more carbon atoms per molecule. The improved process of this invention utilizes an adsorptive solid-contact catalyst of such specificity and activity that high-boiling olefins can be converted to the corresponding mercaptans and/or thioethers with a minimum of depolymerization and other undesirable side reactions. Other objects and advantages of the invention will become apparent to one skilled in the art from the accompanying description and discussion. The process disclosed is of particular value in the manufacture of high-boiling mercaptans which are exceptionally desirable modifiers in the manufacture of synthetic rubber of the Buna type, such as copolymers of diolefins with vinyl compounds such as styrene, acrylonitrile, esters of acrylic acid, etc.

It has now been found that the olefin-hydrogen sulfide reaction, and the olefin-mercaptan reaction, as applied to $C_8$ and higher olefins to produce high-boiling mercaptans and/or thioethers, is smoothly effected in the presence of an activated montmorillonite clay. This type of catalyst is described in an article by Davidson et al. at pages R-318 to R-321 of "National Petroleum News," issue of July 7, 1943.

The preferred catalysts used in the process of this invention occur in nature—before activation—as montmorillonite, which is believed to have the ideal formula $Al_2Si_4O_{10}(OH)_2 \cdot nH_2O$, and an actual formula corresponding to $$MgO \cdot Al_2O_3 SiO_2 \cdot nH_2O,$$

since in nature the ideal formula is not realized due to substitutions. The natural montmorillonite clay has a crystalline rather than an amorphous or gel structure, as exemplified by silica gel. One apparently typical substitution in the formula of the product as found in nature is partial replacement of aluminum by magnesium. This montmorillonite mutation does not appear to be haphazard, but characteristically every sixth aluminum ion is apparently supplanted by a magnesium ion, and this replacement of a trivalent cation (aluminum) by a divalent cation (magnesium) is believed to give rise to a deficiency in positive charge. The crystal lattice of the ideal montmorillonite unit crystal cell is characterized by a layer configuration, and each layer is believed to consist of four sheets of oxygen, between the outer sheets of which in the tetrahedral position are located the silicon atoms; in the octahedral position are the aluminum atoms, and in the same oxygen sheets which form the boundaries of the octahedrals are the hydroxyl ions. The deficiency in positive charge caused in the neutral product by the replacement of the trivalent cation by the divalent cation causes the lattice to become negatively charged, and in order to neutralize this charge, various types of cations are adsorbed on the crystal protruding into the water of hydration space between the layers of montmorillonite. The cations, being exposed, are subject to mass action effects and are readily replaceable, thus giving rise to the phenomenon of base exchange which is a characteristic of the substituted montmorillonite.

The raw montmorillonite clay is commonly classified as a non-swelling bentonite and is sometimes referred to as a subbentonite.

Modification of the raw montmorillonite to provide a suitable catalyst for the present invention is effected by activation. The most common form of activation is by means of an acid, and in treating a magnesium substituted montmorillonite in the raw form for use as a catalyst by acid activation, impurities are removed with attendant increase in effective catalytic surface, and also exchangeable ions are replaced by hydrogen: i. e., the surface cations originally present in a magnesium substituted montmorillonite lattice are replaced by hydrogen ions as a result of the activation. Thus, the activated material may be termed a magnesium substituted hydrogen montmorillonite. A further effect of the acid treatment in activating the montmorillonite clay may well be to dissolve a disproportionate amount of alumina, thus increasing the percentage of magnesia. A sample of the activated montmorillonite clay is characterized by the following analysis:

|  | Composition by Weight | |
|---|---|---|
|  | Percent | Dry Basis |
| Magnesia | 4.9 | 6.25 |
| Alumina | 14.4 | 18.45 |
| Water | 21.9 | |
| Silica | Remainder | 75 |
| Ratio Alumina/Magnesia | 3/1 | 3/1 |

The catalyst is of the solid contact type and is preferably used in this invention in the form of pellets ranging in size from four to twenty mesh. Ten grams of this particular material in the form of 4–8 mesh pellets were washed with 50 cc. of distilled water, whereupon the wash water acquired a pH of 3.0. It is obvious that the above analysis of the particular percentages of magnesia, alumina, silica, and water will vary within reasonable limits, depending on various factors, such as the source of the clay, the extent and character of the acid treatment, etc.

This invention is not limited to the addition of hydrogen sulfide and mercaptans to the higher olefins, but also extends to the use of lower molecular weight olefins; although the latter are not full equivalents in the operations described. A definite gradation in reactivity exists between the lower and higher members of the aliphatic olefin series, thus requiring somewhat different conditions for effective conversion to the corresponding mercaptans and/or thioethers.

In a specific preferred embodiment of the invention, a $C_{12}$–$C_{14}$ fraction, derived from the catalytic polymerization of $C_3$ and $C_4$ olefins, in admixture with the desired molal proportion of hydrogen sulfide is contacted with the catalyst under the following conditions: pressures ranging from about 100 to 1,500 pounds gage; temperatures from about atmospheric to about 400° F.; catalyst comprising a magnesium substituted hydrogen montmorillonite; flow-rate of one to ten liquid volumes per volume of catalyst per hour. Under the aforesaid conditions, the principal reaction occurring is apparently addition of $H_2S$ to the olefinic linkages so that the combined sulfur is found in mercaptans corresponding substantially in boiling range to those expected from the composition of the olefin feed. The total effluent from the reaction zone is treated by conventional means for recovery of hydrogen sulfide and the unreacted hydrocarbon is fractionated out of the product. This latter operation is preferably accomplished under diminished pressure.

The hydrocarbon-hydrogen sulfide or hydrocarbon-mercaptain feed mixture may be passed continuously through a stationary bed of the solid granular contact catalyst or otherwise contacted with the solid catalyst, and the catalyst effluent may be either continuously or intermittently fractionated to separate unreacted olefin and hydrogen sulfide and/or mercaptan from the product. In producing mercaptans, ordinarily an excess of hydrogen sulfide is present in the feed which may be returned to the catalyst along with fresh olefin. Operation may be either batchwise or continuous, with the latter usually preferred. A plurality of catalyst cases may be provided in order to maintain uninterrupted operation during catalyst replacement or regeneration procedure. Instead of feeding hydrogen sulfide predissolved in the olefin charge, other means of introduction to the reaction zone may be employed. For example, hydrogen sulfide may be added at one or more points directly into the catalyst chamber in order to maintain a predetermined concentration at various points within the catalyst space. Temperature control within the catalyst space may be obtained by regulation of feed preheating means, or heat exchange devices may be provided within or about the catalyst.

The mixed olefin-hydrogen sulfide feed or olefin-mercaptan feed is passed through the catalyst bed, or otherwise reacted in contact with the catalyst, under controlled conditions with respect to the hydrogen sulfide-olefin or mercaptan-olefin mol ratio. When producing mercaptans, in order to suppress undesirable side reactions and to favor mercaptan formation, it is desirable to employ a molal excess of hydrogen sulfide. Due to the high degree of specificity toward promotion of the mercaptan reaction exhibited by the catalyst of this invention, only a moderate excess of hydrogen sulfide is required. Satisfactory reaction mixtures may contain olefin-hydrogen sulfide in ratios of between about 1:1 and about 1:6 with an intermediate preferred value of about 1:1.5. Ratios lower than 1:1 result in increased formation of alkyl sulfides.

The activated montmorillonite catalyst as generally used has relatively coarse granules within a range of about four to about twenty mesh, but, if desired, may be used as a fine powder in suspension in the reacting stream. The preferred mesh range for the catalyst is from about four to about eight mesh.

The temperature within the catalyst bed, or the reaction temperature, is chosen to conform with the catalyst activity, the feed composition, the operating pressure, and the reaction time in order to secure most efficient conversion of the olefin to mercaptan or thioether. Suitable temperatures over the range of preferred operating conditions are usually within the range of about 100° F. to about 400° F., with a somewhat narrower range of about 150° F. to about 250° F. However, higher temperatures are permissible. It is one of the features of this invention that the catalyst employed has the beneficial effect of reduced depolymerization or cracking of high molecular weight olefins, permits the use of higher temperatures for the reactions, and results in higher yields of high molecular weight mercaptans and/or sulfides at the usual temperatures of reaction.

Since the mercaptan and thioether syntheses described hereinbefore are exothermic, means for dissipating any excess heat and preventing excessive temperature increases are ordinarily provided. Such means may include cooling the catalyst bed by internal or external heat exchange apparatus, or, more conveniently, by reducing the amount of preheat supplied to the feed ahead of the catalyst, or use of an inert diluent. Excessive temperatures tend to favor formation of hydrocarbon decomposition products.

Catalyst life in the present process is ordinarily very long, since the relatively low temperatures and the mixed phase operation both tend to prevent the accumulation of tarry poisons and carbonaceous deposits. Thus, several hundred volumes of high-boiling mercaptan and/or thioether may often be produced per volume of catalyst before any significant change in activity is evident.

Operating pressures are chosen in accordance with reaction requirements. For example, the desired mercaptan-forming reaction is apparently promoted to some extent by pressure which may be effective by virtue of the increased hydrogen sulfide concentration at the active centers of the contact catalyst. Relatively high pressures also tend to prevent the formation of low molecular weight mercaptans. The preferred pressures are usually in the range of about 100 to 3,000 pounds gage; however, operation is most conveniently and economically carried out between about 500 to about 1,000 pounds gage pressure.

When temperature and pressure conditions are selected to conform with catalyst activity and desired extent of conversion, rather high flow rates of reactants may be employed. With the preferred catalysts of this invention, flow rates as high as ten liquid volumes of feed per hour per volume of catalyst may be employed.

As will be appreciated by one skilled in the art, other process modifications may be employed. A reaction mixture may be passed in a closed continuous cycle through a fixed catalyst bed, with reactants being continuously added near the entrance of the bed and with a portion of the circulating mixture being withdrawn from the system and with recovery of a desired mercaptan product, or fraction, from such portion. The catalyst, in finely-divided form, may be suspended in the reaction mixture, which is then passed directly through the reaction zone or which may be reacted in a continuously circulating stream. In any of such modifications, the reaction mixture may be in a single phase, or in mixed vapor-liquid phase, with or without vaporization of a liquid phase during reaction to aid in temperature control.

The feed stocks for the process of manufacture of the desired high-boiling mercaptans and/or thioethers may be derived from any suitable source, such as catalytic polymerization units. In some cases it is desirable to utilize a feed rich in $C_{11}-C_{16}$ olefins, and even higher olefins, and commercial tri-isobutylene or a close-cut fraction of heavy polymer produced in the catalytic polymerization of $C_2-C_8$ olefins may be employed. The latter feed source is especially desirable, and a desired olefin stock is a by-product of aviation gasoline co-dimer production which affords an economically attractive integration of plant operations. A heavy olefin fraction falling in the boiling range between about 335° F. and about 550° F. at 760 mm. may be satisfactorily utilized in the present process for synthesis of mercaptans and/or sulfides having from eleven to sixteen carbon atoms per alkyl radical within the molecule.

The hydrogen sulfide may be derived from any convenient source, and is particularly abundant as a by-product from petroleum refining processes and from natural gasoline treating plants. Pure hydrogen sulfide, while often desirable, is not essential to the successful operation of this invention; although it is preferred to have the concentration of impurities, such as carbon-dioxide, below about five per cent of the hydrogen sulfide, for optimum results. The mercaptans used in the feed mixture according to this invention are preferably straight or branched-chain alkyl mercaptans. These mercaptans may contain as many as twenty or more carbon atoms; preferably they fall in the range of one to sixteen carbon atoms. The improved efficiency of the catalyst in accordance with this invention extends both to the low molecular weight mercaptan-olefin reactions as well as to the high molecular weight mixtures. Further, the invention is applicable, with improved efficiency, to high or low molecular weight olefins reacted with mercaptans having high or low molecular weight alkyl radicals. If desired, and particularly in the production of high-boiling alkyl mercaptans, the invention may be practiced by first forming the mercaptan by the use of the catalyst described herein; whereupon, either with or without isolation of the mercaptan produced from the feed mixture, further olefin or olefins may be added and the reaction continued to produce a relatively high yield of thioether or thioethers. When the latter system is used, the conditions may be controlled to produce maximum utilization of the hydrogen sulfide and the mercaptan or mercaptans, with attendant minimization of hydrogen sulfide and mercaptans in the effluent.

The process of recovering the high-boiling mercaptans and/or thioethers from the catalyst effluent comprises a stabilization or distillation operation for the recovery of unreacted hydrogen sulfide or mercaptans, as the case may be, a stripping operation for the removal of unreacted olefin and/or hydrocarbon impurities, and finally a fractional distillation of the mercaptan or thioether product. The stripping and distillation operations may be carried out as diminished-pressure operations as ordinarily carried out with vacuum pumps or with steam. Other methods of separating mercaptan or thioether from unreacted olefins and other material, especially solvent extraction, may be employed, if desired.

The catalyst used in the reaction according to this invention permits the use of higher temperatures for the reaction and results in higher yields of higher molecular weight sulfur reaction products at the usual temperatures of reaction. The catalyst is also more effective than previous catalysts, including various natural and synthetic silica-alumina and silica-zirconia catalysts.

In order further to illustrate the specific uses and advantages of the present invention, the following exemplary operations will be described. However, since these and numerous other process modifications will be obvious in the light of the foregoing disclosure, no undue limitations are intended.

Example I

Pelleted magnesium substituted hydrogen montmorillonite, as described above, was ground to a twelve to twenty-mesh size and used to pack a 100 cc. catalyst case.

Hydrogen sulfide was dissolved in an olefin charge stock with a boiling point at 760 mm. Hg in the range 420° F. to 520° F., and comprising approximately 98 per cent of $C_{13}$ to $C_{16}$ olefins until a mol ratio of hydrogen sulfide to olefin of 1.5:1 was obtained. This composition was passed over the twelve to twenty-mesh catalyst at an average reaction temperature of about 230° F. at a rate of one liquid volume per volume of catalyst per hour and a pressure of 1,000 p. s. i. g. The effluent product was treated to remove unreacted hydrogen sulfide and olefin, which could then be recycled to the reaction zone. The yield of mercaptan product amounted to eighty per cent of the converted olefin, upon a weight basis.

Example II

Six hundred and fifty gallons of four to eight-mesh pellets of magnesium substituted hydrogen montmorillonite, as described above, were placed in a catalyst chamber for hydrogen sulfide-olefin synthesis. The olefin feed was a 400° F. to 460° F. fraction of heavy polymer from a catalytic polymerization unit treating a mixture of $C_7$ olefins. The composition of this fraction consists primarily of $C_{14}$ olefins.

The feed for the mercaptan reaction was prepared by blending hydrogen sulfide to the olefin fraction in a mol ratio of 1.5:1. The feed blend was charged to the catalyst case under a pressure of 1,000 p. s. i. g. A reaction temperature of 200° to 220° F. was maintained at a charge rate of two liquid volumes per volume of catalyst per hour. The effluent raw product was washed to remove $H_2S$ and then fractionally distilled under reduced pressure to remove unreacted olefin. The final product assayed ninety per cent. mercaptan, boiling between 240° and about 300° F. at 5 mm. Hg pressure. Under these conditions, only a minor quantity of $C_7$ and lighter mercaptans was obtained and substantially no alkyl thioethers. The yield of mercaptan amounted to about one hundred per cent of the converted olefin, upon a weight basis.

Example III

A test was run using reaction conditions in all respects comparable to Example II, except that a silica-alumina catalyst, as described in application Serial No. 493,463, was used in lieu of the activated montmorillonite. The yield of $C_{14}$ mercaptan amounted to about seventy per cent by weight based on converted feed stock. The increase in effectiveness of the process of Example II over the previous process, represented by Example III, is indicated by the higher yield of the desired $C_{14}$ mercaptan and the lower yield of the $C_7$ mercaptan.

What is claimed is:

1. A process of making thiols and thioethers which comprises contacting at a temperature between 100 and 400° F. an olefin hydrocarbon having at least 8 carbon atoms per molecule, with a molar excess of a compound having the formula RSH, where R is selected from the group consisting of hydrogen and alkyl radicals, substantially non-reactive under the reaction conditions, in the presence of an acid activated montmorillonite catalyst, comprising a crystalline montmorillonite, which in its naturally occurring state has one-sixth of the aluminum replaced by magnesium, in which the ratio of alumina to magnesia is about 3 to 1, the amount of alumina being about 18 per cent on a dry basis, the residue other than alumina and magnesia being essentially silica.

2. The process in accordance with claim 1, in which the olefin fraction has a boiling range from about 400 to 500° F. and is composed principally of $C_{13}$ and $C_{16}$ olefins.

3. The process in accordance with claim 1, in which the olefin feed has a boiling range from about 400 to 460° and is composed principally of $C_{14}$ olefins.

4. A process which comprises contacting at a temperature between 100 and 400° F. an olefin hydrocarbon having at least 8 carbon atoms per molecule, with a compound having the formula RSH, where R is selected from the group consisting of hydrogen and alkyl radicals, substantially non-reactive under the reaction conditions, in the presence of an acid activated montmorillonite catalyst, comprising a crystalline montmorillonite, which in its naturally occurring state has one-sixth of the aluminum replaced by magnesium and on a dry basis contains about 18 per cent alumina, about 6 per cent magnesia, and the remainder silica.

5. The process in accordance with claim 4, in which the olefin fraction has a boiling range from about 400 to 500° F. and is composed principally of $C_{13}$ and $C_{16}$ olefins.

6. The process in accordance with claim 4 in which the olefin feed has a boiling range from about 400 to 460° F. and is composed principally of $C_{14}$ olefins.

7. A process which comprises contacting at between about 150° F. and about 250° F. an olefinic hydrocarbon having at least 8 carbon atoms per molecule with a compound having the formula RSH, where R is selected from the group consisting of hydrogen and alkyl radicals substantially non-reactive under the reaction conditions, in the presence of an acid activated montmorillonite which has substantially the weight analysis: 4.9% magnesia, 14.4% alumina, 21.9% water, and the remainder is silica.

GRAHAM H. SHORT.

REFERENCES CITED

The following references are of record in the file of this patent:

UNITED STATES PATENTS

| Number | Name | Date |
|---|---|---|
| 2,101,096 | Reuter et al. | Dec. 7, 1937 |
| 2,373,343 | Rummelsburg | Apr. 10, 1945 |
| 2,387,224 | Badertscher et al. | Oct. 16, 1945 |
| 2,392,554 | Schulze | Jan. 8, 1946 |
| 2,392,555 | Schulze | Jan. 8, 1946 |
| 2,449,891 | Gary et al. | Sept. 21, 1948 |

OTHER REFERENCES

Duffy et al., Ind. and Eng. Chem., January 1934, pp. 91–93.

Jones et al., Jour. Am. Chem. Soc., vol. 60, October 1938, pp. 2452–55.